US010935671B2

(12) United States Patent
Zhang et al.

(10) Patent No.: US 10,935,671 B2
(45) Date of Patent: Mar. 2, 2021

(54) POSITIONING METHOD, ASSISTANT SITE, AND SYSTEM (71) Applicant: HUAWEI TECHNOLOGIES CO., LTD., Shenzhen (CN)

(72) Inventors: Yi Zhang, Shanghai (CN); Guoqing Zhang, Shanghai (CN); Feng Zhou, Shanghai (CN); Quanfeng Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/440,957

(22) Filed: Jun. 13, 2019

(65) Prior Publication Data

US 2019/0293807 A1  Sep. 26, 2019

Related U.S. Application Data (63) Continuation of application No. PCT/CN2017/115875, filed on Dec. 13, 2017.

(30) Foreign Application Priority Data

Dec. 13, 2016 (CN) .......................... 201611145753.7

(51) Int. Cl.
*H04W 24/00* (2009.01)
*G01S 19/48* (2010.01)
(Continued)

(52) U.S. Cl.
CPC .............. *G01S 19/48* (2013.01); *H04B 17/27* (2015.01); *H04L 5/0051* (2013.01); *H04W 64/00* (2013.01); *H04W 64/006* (2013.01)

(58) Field of Classification Search
CPC combination set(s) only.
See application file for complete search history.

(56) References Cited

U.S. PATENT DOCUMENTS

2006/0128399 A1  6/2006 Duan et al.
2009/0011774 A1  1/2009 Shan et al.
(Continued)

FOREIGN PATENT DOCUMENTS

CN  103260237 A  8/2013
CN  103813440 A  5/2014
(Continued)

OTHER PUBLICATIONS

"Agenda item:6.2.7.2 Document for decision", 3GPP Draft;R1-165825_(WF on PRS-Based TBS), 3GPP, vol. RAN WG1, No. Nanjing, China; May 23, 2016-May 27, 2016, May 30, 2016, XP051111994, 4 pages.
(Continued)

*Primary Examiner* — Justin Y Lee
(74) *Attorney, Agent, or Firm* — Kilpatrick Townsend & Stockton LLP (57) ABSTRACT

Embodiments provide a positioning method, an assistant site, and a system, to improve positioning accuracy of a mobile terminal. The method according to the embodiments of the present invention includes: generating, by an assistant site, a downlink assisted positioning signal; and sending, by the assistant site, the downlink assisted positioning signal to a mobile terminal. The downlink assisted positioning signal can enable a base station to determine position information of the mobile terminal based on a measurement result obtained by the mobile terminal by measuring the downlink assisted positioning signal.

7 Claims, 10 Drawing Sheets

(51) Int. Cl.
*H04B 17/27* (2015.01)
*H04L 5/00* (2006.01)
*H04W 64/00* (2009.01)

(56) References Cited

U.S. PATENT DOCUMENTS

2015/0296474 A1 10/2015 Cai et al.
2018/0139578 A1 5/2018 Xiao et al.
2020/0045667 A1* 2/2020 Modarres Razavi ........................
G01S 5/0236

FOREIGN PATENT DOCUMENTS

| CN | 105338624 A | 2/2016 |
| CN | 105657820 A | 6/2016 |
| CN | 106199516 A | 12/2016 |
| CN | 106714299 A | 5/2017 |
| EP | 2472969 A1 | 7/2012 |
| EP | 2818886 A1 | 12/2014 |

OTHER PUBLICATIONS

"3rd Generation Partnership Project; Technical Specification GroupRadio Access Network; Evolved Universal Terrestrial Radio AccessNetwork (E-UTRAN);Stage 2 functional specification of UserEquipment (UE) positioning in E-UTRAN (Release 14)", 3GPP Draft; Draft 36305-E00_WITH_REV_MARKS, 3GPP, Dec. 12, 2012, XP051203411 , 75 pages.

* cited by examiner

POSITIONING METHOD, ASSISTANT SITE, AND SYSTEM

CROSS-REFERENCE TO RELATED APPLICATIONS

This application is a continuation of International Application No. PCT/CN2017/115875, filed on Dec. 13, 2017, which claims priority to Chinese Patent Application No. 201611145753.7, filed on Dec. 13, 2016. The disclosures of the aforementioned applications are hereby incorporated by reference in their entireties.

TECHNICAL FIELD

This application relates to the field of communications technologies, and in particular, to a positioning method, an assistant site, and a system.

BACKGROUND

In a mobile communications network, a mobile terminal may communicate with one or more base stations. The base station obtains position information of the mobile terminal relative to the base station, and may then obtain position information of the mobile terminal of particular precision by using known position information of the base station, to position the mobile terminal.

Figure 1:
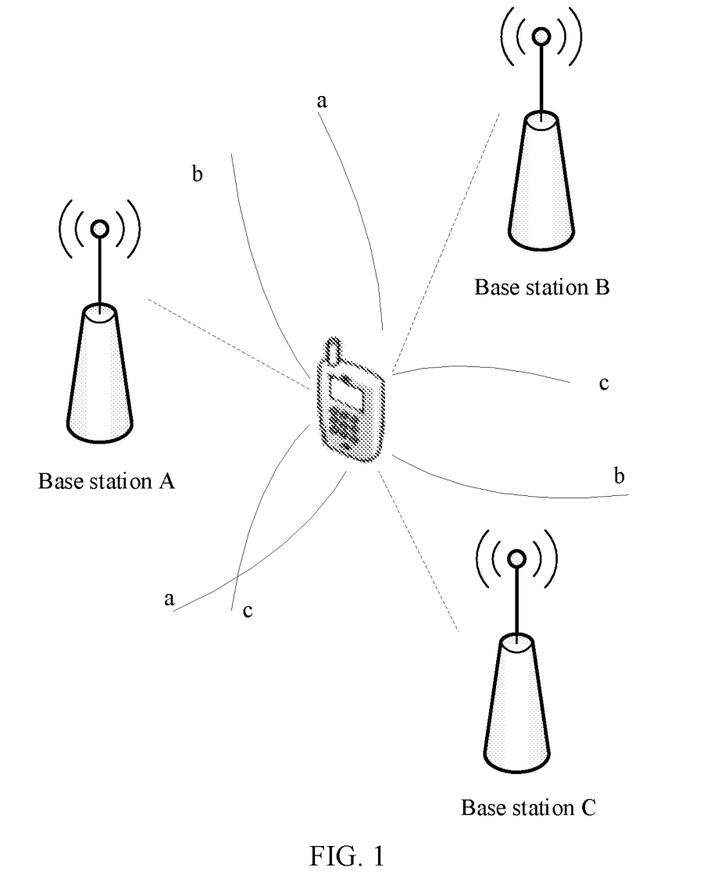
FIG. 1 is a schematic diagram of existing time of arrival-based positioning.

An existing solution provides a positioning method of a mobile terminal. FIG. 1 is a schematic diagram of existing time of arrival-based positioning. In FIG. 1, three base stations and one mobile terminal are used as an example for description. The three base stations are respectively a base station A, a base station B, and a base station C. The base station A broadcasts a signal to the mobile terminal (where a transmission speed of the signal is a constant value). After receiving the signal, the mobile terminal calculates a distance d1 between the mobile terminal and the base station A based on a time of arrival of the signal. Therefore, the mobile terminal should be located on a circular arch (for example, a circular arch a in FIG. 1) using the base station A as a circle center and d1 as a radius. Likewise, the mobile terminal should be located on a circular arch (for example, a circular arch b in FIG. 1) using the base station B as a circle center and d2 as a radius, and the mobile terminal should be located on a circular arch (for example, a circular arch c in FIG. 1) using the base station C as a circle center and d3 as a radius. In this way, an intersecting point of the circular arch a, the circular arch b and the circular arch c is a position of the mobile terminal, so that the mobile terminal is located.

However, in an actual case, there are a very limited quantity of neighboring base stations in a commercial network, and a mobile terminal cannot even detect a neighboring base station at many places. In addition, in the commercial network, transmit powers of the base stations are controlled to control interference between the base stations. Consequently, signals of the neighboring base stations detected by the mobile terminal are not that strong. This reduces a signal-to-noise ratio and affects positioning accuracy of the mobile terminal.

SUMMARY

Embodiments of this application provide a positioning method, an assistant site, and a system, to improve positioning accuracy of a mobile terminal.

In view of this, a first aspect of the embodiments of the present invention provides a positioning method. The method may include the following content. An assistant site may be set first in the present invention when position information of a mobile terminal needs to be determined. The assistant site may have two forms, namely, eLite and eBeacon. An operating frequency band of the assistant site may be an operator frequency spectrum, or may be an unlicensed frequency spectrum. The assistant site may achieve synchronization by using a particular technique. The technique includes, but is not limited to: achieving synchronization by using high-precision Global Positioning System (GPS), or achieving synchronization by sniffing a synchronization channel of a neighboring base station. After the assistant site is set, the assistant site generates a downlink assisted positioning signal. The assistant site sends the downlink assisted positioning signal to the mobile terminal. The mobile terminal measures the downlink assisted positioning signal after receiving the downlink assisted positioning signal, to obtain a measurement result, and then sends the measurement result to the base station. The base station determines the position information of the mobile terminal based on the measurement result after receiving the measurement result. It can be learned that, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

In some possible implementations, the downlink assisted positioning signal includes at least one of the following: a CRS and a PRS. It may be understood that the downlink assisted positioning signal may also be another type of signal, and this is not limited herein.

In some other possible implementations, because the assistant site does not provide a basic communication function, a user is not allowed to access or camp on the assistant site. Otherwise, another communication function of the user is affected. Therefore, the assistant site broadcasts that the assistant site is a site that cannot be camped on and/or accessed.

A second aspect of the embodiments of the present invention further provides a positioning method. The method may include: sending, by a mobile terminal, an uplink sounding signal to an assistant site; receiving, by the assistant site, the uplink sounding signal; measuring, by the assistant site, the uplink sounding signal to obtain a measurement result; sending, by the assistant site, the measurement result to a base station; and determining, by the base station after receiving the measurement result, position information of the mobile terminal based on the measurement result. It can be learned that, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

In some possible implementations, the uplink sounding signal includes, but is not limited to, a sounding reference signal.

In another possible implementation, the measuring, by the assistant site, the uplink sounding signal to obtain a measurement result may include: sending, by the base station, indication information to the assistant site; and measuring, by the assistant site based on the indication information, the uplink sounding signal, to obtain the measurement result, where the measurement result includes, but is not limited to, a TOA and an AOA.

A third aspect of the embodiments of the present invention provides an assistant site. The assistant site is configured to implement the functions of the method according to any one of the first aspect or the optional implementations of the first aspect, and is implemented by software. The software of the assistant site includes modules corresponding to the foregoing functions. The modules corresponding to the foregoing functions may include a generation module and a sending module. The generation module is configured to implement a corresponding generation function, and the sending module is configured to implement a corresponding sending function.

A fourth aspect of the embodiments of the present invention provides an assistant site. The assistant site is configured to implement the functions of the method according to any one of the second aspect or the optional implementations of the second aspect, and is implemented by software. The software of the assistant site includes modules corresponding to the foregoing functions. The modules corresponding to the foregoing functions may include a receiving module, a measurement module, and a sending module. The receiving module is configured to implement a corresponding receiving function, the measurement module is configured to implement a corresponding measurement function, and the sending module is configured to implement a corresponding sending function.

A fifth aspect of the embodiments of the present invention provides a positioning system. The positioning system includes the assistant site, the mobile terminal, and the base station according to the third aspect of the embodiments of the present invention.

A sixth aspect of the embodiments of the present invention provides a positioning system. The positioning system includes the assistant site, the mobile terminal, and the base station according to the fourth aspect of the embodiments of the present invention.

It can be learned from the foregoing technical solutions that, the embodiments of the present invention have the following advantages: Because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may derive other drawings from these accompanying drawings.

DESCRIPTION OF EMBODIMENTS

Embodiments of the present invention provide a positioning method, an assistant site, and a system, to improve positioning accuracy of a mobile terminal.

The following describes the technical solutions in the embodiments of the present invention with reference to the accompanying drawings in the embodiments of the present invention. Apparently, the described embodiments are merely some but not all of the embodiments of the present invention. All other embodiments obtained based on the embodiments of the present invention shall fall within the protection scope of the present invention.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other steps or units not expressly listed or inherent to such a process, method, product, or device.

Embodiments in accordance with the disclosure can be applied to a wireless communications system, and is applicable to various scenarios. Technical solutions in accordance with the disclosure may be used in all scenarios requiring improvement of positioning precision. The scenarios to which the present invention is applicable include but are not limited to the following scenarios: 1. Positioning of a non-line-of-sight (NLOS) area; 2. Positioning of a far point such as a cell edge; 3. Positioning of the inside of a building; 4. A scenario in which there is an extremely small quantity of base stations visible to a mobile terminal.

Figure 2:
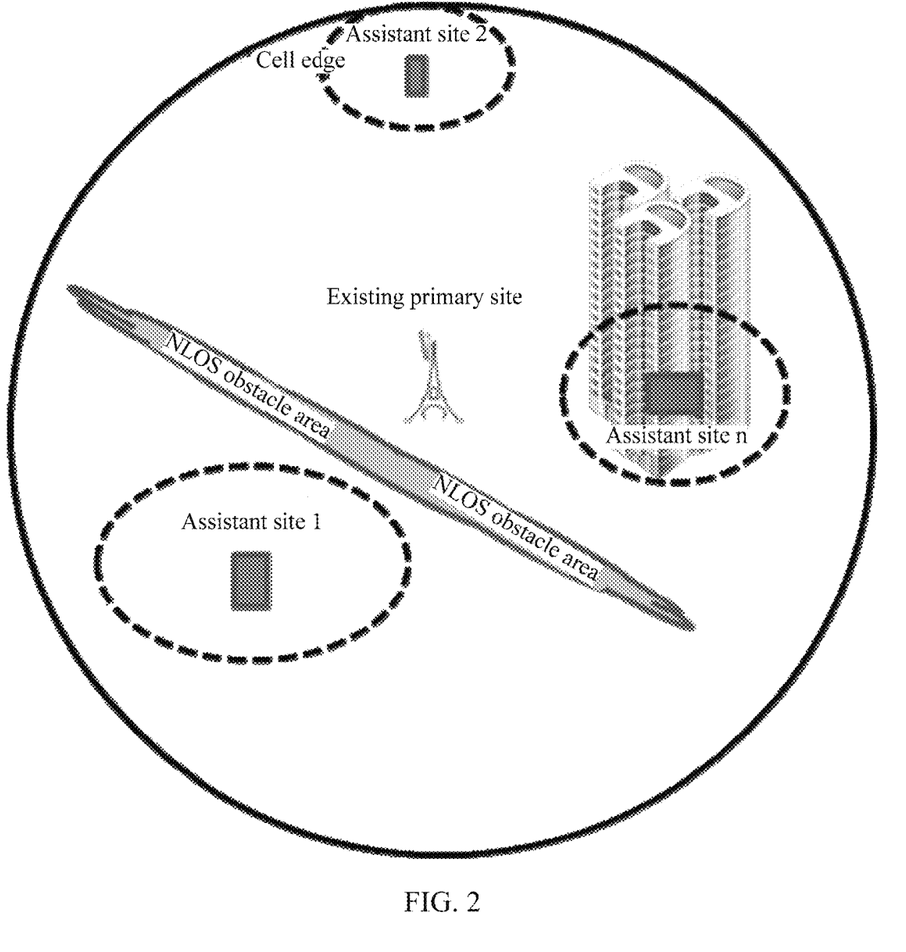
FIG. 2 is a schematic diagram of an application scenario of an assistant site according to an embodiment of the present invention.

FIG. 2 is a schematic diagram of an application scenario of an assistant site according to one embodiment. An existing primary site is an operator base station in a commercial network, and an assistant site is an assisted positioning site (assistant site) according to the present invention. An assistant site 1 may improve positioning precision of an NLOS obstacle area, and an assistant site 2 may improve positioning precision of a cell edge, and an assistant site n may improve positioning precision of the inside of a room. An assistant site may continue to be deployed if there is another requirement.

Figure 3:
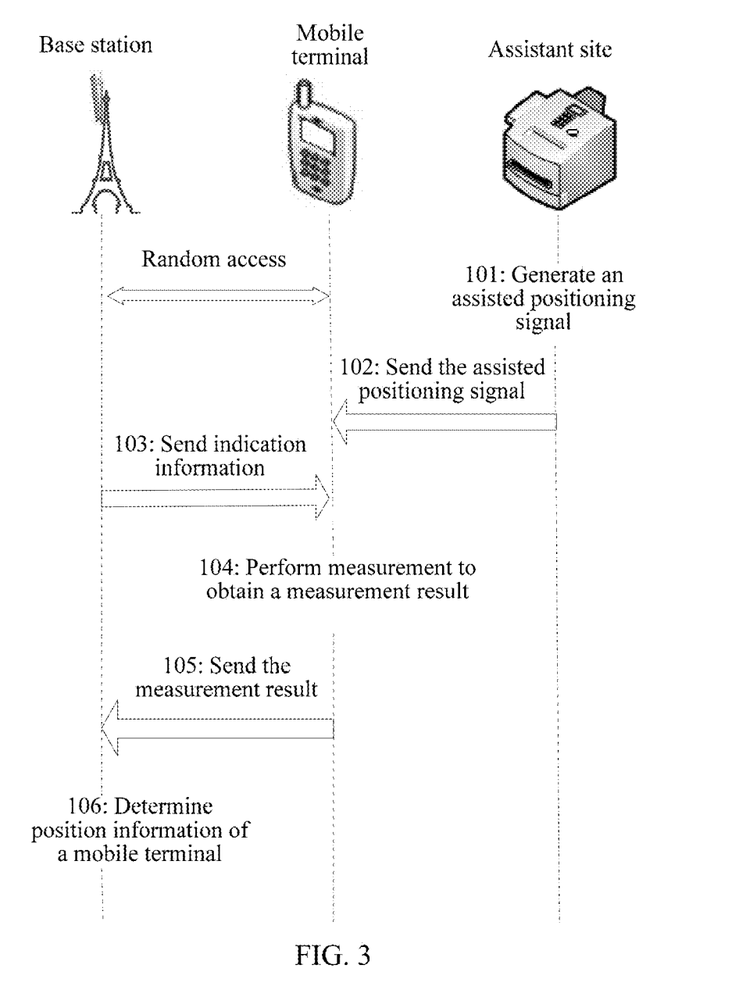
FIG. 3 is a schematic diagram of a positioning method according to an embodiment of the present invention.

Referring to FIG. 3, an embodiment of the present invention provides a positioning method. The method includes the following steps.

101: An assistant site generates a downlink assisted positioning signal.

In this embodiment, the assistant site may be set first when position information of a mobile terminal needs to be determined. A position of the assistant site is fixed. Then, the assistant site generates the downlink assisted positioning signal.

In some embodiments, in some embodiments of the present invention, the downlink assisted positioning signal includes at least one of the following: a cell-specific reference signal (CRS) and a position reference signal (PRS). It should be noted that the downlink assisted positioning signal may also be another type of signal, and this is not limited herein.

102: The assistant site sends the downlink assisted positioning signal to a mobile terminal.

In this embodiment, in a process in which the assistant site sends the downlink assisted positioning signal, the assistant site may further send a downlink synchronization signal, for example, a primary synchronization signal (PSS) and a secondary synchronization signal (SSS). The assistant site may further send a broadcast signal and the like.

Because the assistant site does not provide a basic communication function, a user is not allowed to access or camp on the assistant site. Otherwise, another communication function of the user is affected. Therefore, in some embodiments, the assistant site broadcasts that the assistant site is a site that cannot be camped on and/or accessed.

103: A base station sends indication information to the mobile terminal.

In this embodiment, the indication information is used to instruct the mobile terminal to measure the downlink assisted positioning signal.

104: The mobile terminal measures the downlink assisted positioning signal based on the indication information, to obtain a measurement result.

In this embodiment, the measurement result may include a time of arrival (TOA) and an angle of arrival (AOA) of the downlink assisted positioning signal.

105: The mobile terminal sends the measurement result to the base station.

106: The base station determines position information of the mobile terminal based on the measurement result.

In this embodiment, it should be noted that before step 101, the mobile terminal accesses a commercial network and camps on the base station.

In this embodiment, because a better channel environment can be designed between the assistant site and the mobile terminal, the position information of the mobile terminal obtained by the base station has higher confidence, and the base station can more accurately position the mobile terminal. Therefore, according to the present disclosure, positioning accuracy of the mobile terminal can be improved.

Based on the foregoing embodiment, the following describes the positioning method according to this embodiment by using three examples.

Example 1

Figure 4:
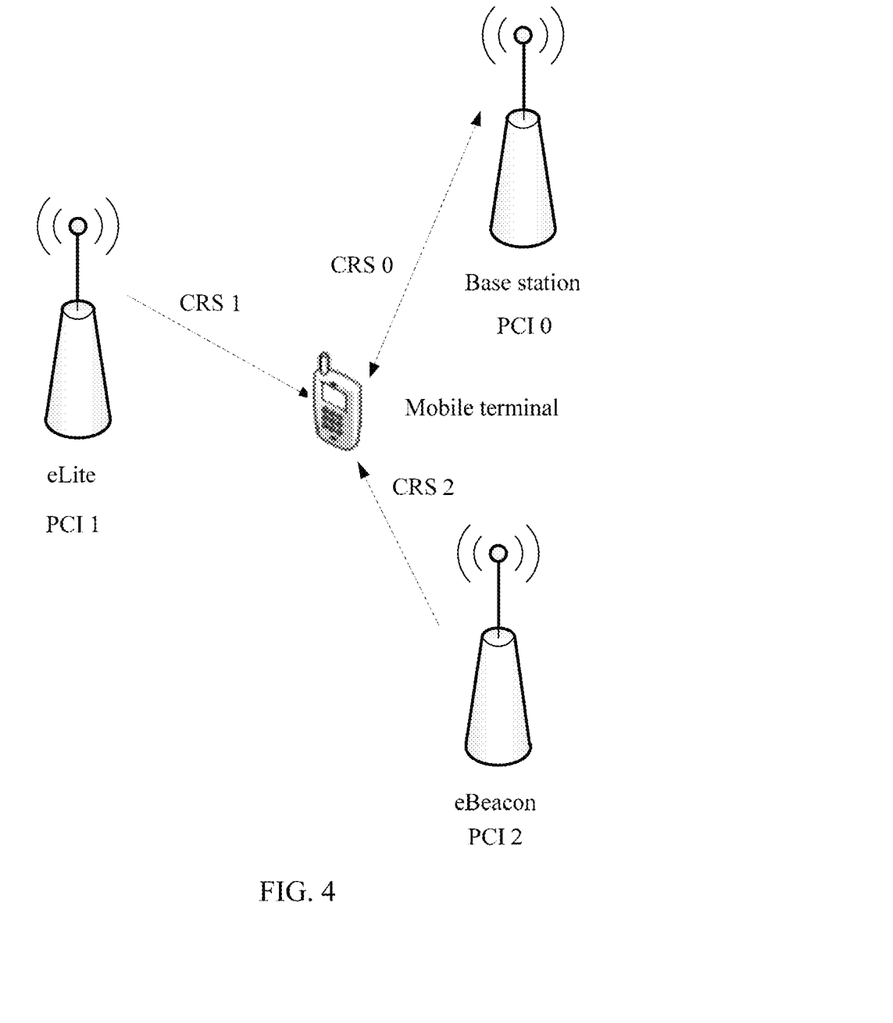
FIG. 4 is a schematic diagram of positioning in which a CRS is used as a downlink assisted positioning signal according to an embodiment of the present invention.

FIG. 4 is a schematic diagram of positioning in which a CRS is used as a downlink assisted positioning signal according to one embodiment. In some embodiments, in FIG. 4, the CRS is used as the assisted positioning signal. An assistant site includes two forms, namely, eLite and eBeacon. eLite has a higher transmit power and may be used for an outdoor deployment with wider coverage, and eBeacon has a lower transmit power and may be used for an indoor deployment and an outdoor deployment with a limited range. The schematic diagram of the positioning has the following features.

1. The assistant site transmits a downlink synchronization signal, for example, a PSS and an SSS. The assistant site further transmits a CRS, a broadcast signal, and the like.

In FIG. 4, the assistant site in the form of eLite transmits a CRS 1 to a mobile terminal, the assistant site in the form of eBeacon transmits a CRS 2 to the mobile terminal, and a CRS 0 may be transmitted between a base station and the mobile terminal.

2. The assistant site has protocol control information (PCI) independent of protocol control information of a serving cell, and may broadcast that the assistant site is a site that cannot be camped on/accessed.

In FIG. 4, PCI of the assistant site in the form of eLite is PCI 1, PCI of the assistant site in the form of eBeacon is PCI 2, and PCI of the serving cell, that is, the base station, is PCI 0.

3. The assistant site does not need to configure an interface such as an S1 interface or X2 interface.

4. The mobile terminal accesses a commercial network and camps on the base station. The base station configures the mobile terminal to measure a field strength of the assistant site, and the mobile terminal reports a measurement result to the base station.

Example 2

Figure 5:
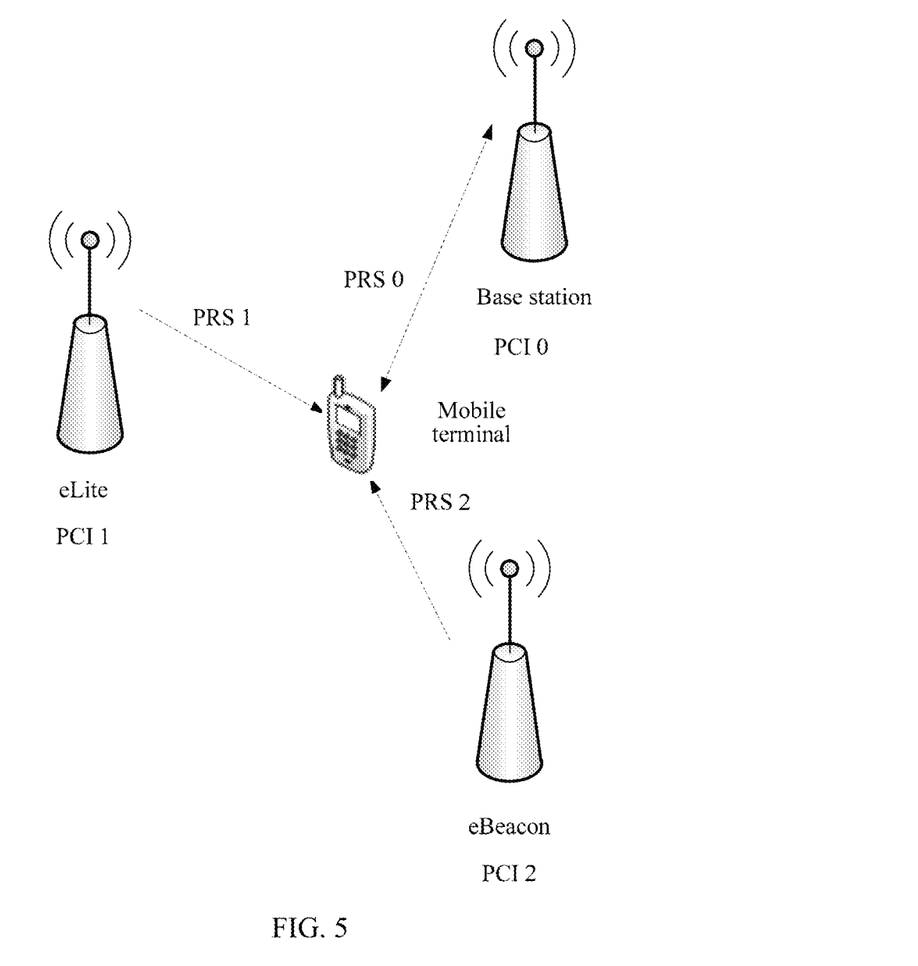
FIG. 5 is a schematic diagram of positioning in which a PRS is used as a downlink assisted positioning signal according to an embodiment of the present invention.

FIG. 5 is a schematic diagram of positioning in which a PRS is used as a downlink assisted positioning signal according to one embodiment. In some embodiments, in FIG. 5, the PRS is used as the assisted positioning signal. An assistant site includes two forms, namely, eLite and eBeacon. eLite has a higher transmit power and may be used for an outdoor deployment with wider coverage, and eBeacon has a lower transmit power and may be used for an indoor deployment and an outdoor deployment with a limited range. The schematic diagram of the positioning has the following features.

1. The assistant site transmits a downlink synchronization signal, for example, a PSS and an SSS. The assistant site further transmits a PRS, a broadcast signal, and the like.

In FIG. 5, the assistant site in the form of eLite transmits a PRS 1 to a mobile terminal, the assistant site in the form of eBeacon transmits a PRS 2 to the mobile terminal, and a PRS 0 may be transmitted between a base station and the mobile terminal.

2. The assistant site has PCI independent of PCI of a serving cell, and may broadcast that the assistant site is a site that cannot be camped on/accessed.

In FIG. 5, PCI of the assistant site in the form of eLite is PCI 1, PCI of the assistant site in the form of eBeacon is PCI 2, and PCI of the serving cell, that is, the base station, is PCI 0.

3. The assistant site does not need to configure an interface such as an S1 interface or X2 interface.

4. The mobile terminal accesses a commercial network and camps on the base station. The base station configures the mobile terminal to measure a field strength of the assistant site, and the mobile terminal reports a measurement result to the base station.

Example 3

Figure 6:
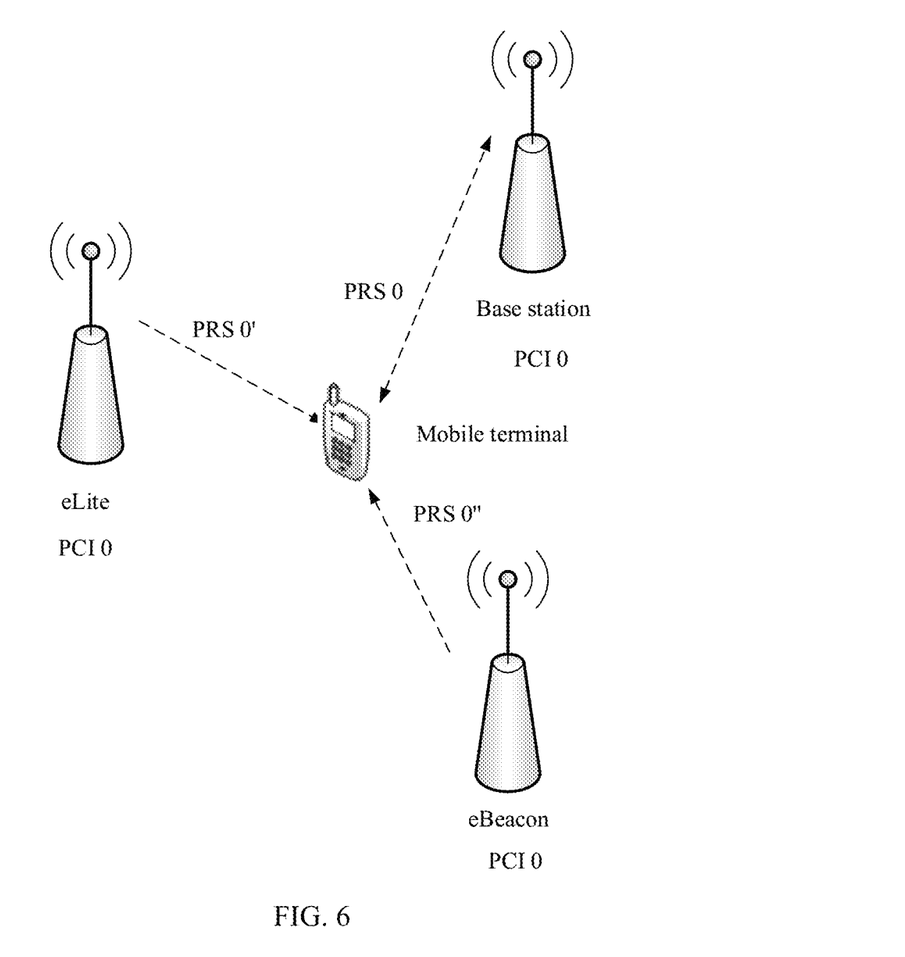
FIG. 6 is another schematic diagram of positioning in which a PRS is used as a downlink assisted positioning signal according to an embodiment of the present invention.

FIG. 6 is another schematic diagram of positioning in which a PRS is used as a downlink assisted positioning signal according to an embodiment of the present invention. In some embodiments, in FIG. 6, the PRS is used as the assisted positioning signal. An assistant site includes two forms, namely, eLite and eBeacon. eLite has a higher transmit power and may be used for an outdoor deployment with wider coverage, and eBeacon has a lower transmit power and may be used for an indoor deployment and an outdoor deployment with a limited range. The schematic diagram of the positioning has the following features.

1. The assistant site uses PCI the same as PCI of a base station, and does not send any information but the PRS.

In FIG. 6, PCI of the assistant site in the form of eLite, PCI of the assistant site in the form of eBeacon, and PCI of a serving cell (the base station) are all PCI 0.

2. The base station may configure different assistant sites to send PRSs on different time-frequency resources.

In FIG. 6, the assistant site in the form of eLite transmits a PRS 0' to a mobile terminal, the assistant site in the form of eBeacon transmits a PRS 0" to the mobile terminal, and a PRS 0 may be transmitted between the base station and the mobile terminal.

3. The assistant site does not need to configure an interface such as an S1 interface or X2 interface.

4. The mobile terminal accesses a commercial network and camps on the base station. The base station configures the mobile terminal to measure a field strength of the assistant site, and the mobile terminal reports a measurement result to the base station.

It can be learned based on this embodiment and the examples that, the base station may obtain more position measurement information, and most of the measurement information has high confidence (because the channel environment between the assistant site and the mobile terminal is better), so that the base station can position the mobile terminal more accurately.

In addition, in this embodiment of the present invention, a system channel delay needs to be periodically corrected. Because a precise position of the mobile terminal is unknown and keeps moving, it is relatively difficult to select a correction anchor. Furthermore, correction precision affects positioning precision of the system. However, in this embodiment of the present invention, the position of the assistant site is fixed and is known, so that the assistant site may be used as a correction anchor, or a mobile terminal near the assistant site may be selected as a correction anchor.

Apparently, in this embodiment, the assistant site has basic assisted positioning signal generation and transmission functions, and an appearance, a power, transmission, and the like of the assistant site can be adjusted, so that deployment of the assistant site is convenient.

Figure 7:
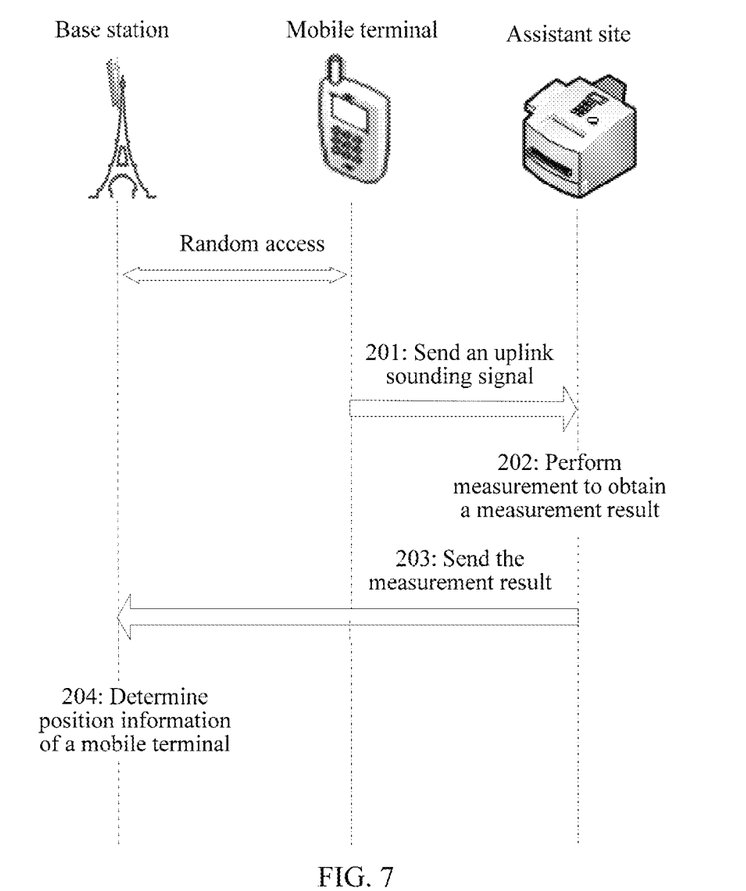
FIG. 7 is a schematic diagram of another positioning method according to an embodiment of the present invention.

Referring to FIG. 7, an embodiment of the present invention provides another positioning method. The method includes the following steps.

201: A mobile terminal sends an uplink sounding signal to an assistant site.

In this embodiment, before step 201, the mobile terminal accesses a commercial network and camps on a base station.

It should be noted that the uplink sounding signal sent by the mobile terminal may also be received by the base station.

In some embodiments, the sounding signal includes an SRS.

202: The assistant site measures the uplink sounding signal to obtain a measurement result.

In this embodiment, after detecting the uplink sounding signal, the assistant site measures the uplink sounding signal, to obtain the measurement result.

In some embodiments, the measuring, by the assistant site, the uplink sounding signal to obtain a measurement result includes:

receiving, by the assistant site, indication information sent by the base station; and measuring, by the assistant site based on the indication information, the uplink sounding signal, to obtain the measurement result, where the measurement result includes a TOA and an AOA.

It may be understood that, the measurement result may also include another measurement parameter, and this is not limited herein.

203: The assistant site sends the measurement result to a base station.

204: The base station determines position information of the mobile terminal based on the measurement result.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

The following describes the positioning method according to this embodiment of the present invention by using a specific example.

Figure 8:
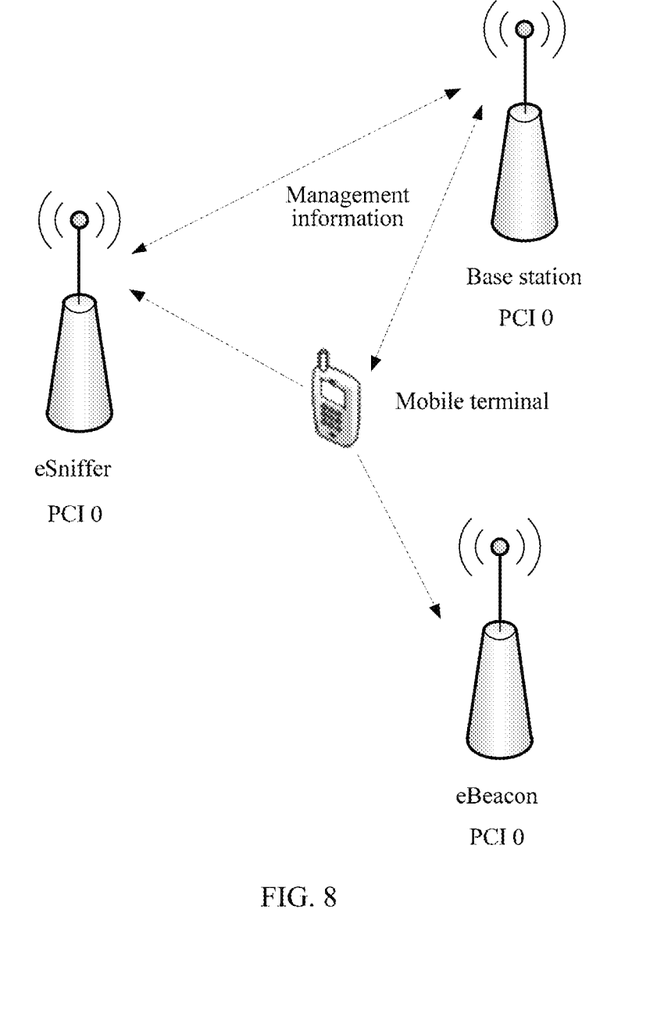
FIG. 8 is a schematic diagram of positioning in which an uplink sounding signal is used as an assisted positioning signal according to an embodiment of the present invention.

FIG. 8 is a schematic diagram of positioning in which an uplink sounding signal is used as an assisted positioning signal according to an embodiment of the present invention. In some embodiments, in FIG. 8, the uplink sounding signal is used as the assisted positioning signal. An assistant site includes two forms, namely, eSniffer and eBeacon. eSniffer has a higher transmit power and may be used for an outdoor deployment with wider coverage, and eBeacon has a lower transmit power and may be used for an indoor deployment and an outdoor deployment with a limited range. The schematic diagram of the positioning has the following features.

1. The assistant site does not have a downlink channel, so that the assistant site performs only uplink detection.

It should be noted that, in the present invention, it may be set, in advance, in such a manner that the assistant site does not have a downlink transmission function, for example, set, at delivery, in such a manner that the assistant site does not have a downlink channel, or configure, during use of the assistant site, in such a manner that the assistant site does not have a downlink transmission function.

2. The assistant site has PCI the same as PCI of a serving cell, and the assistant site may receive management information of the serving cell.

In FIG. 8, PCI of the assistant site in the form of eSniffer, PCI of the assistant site in the form of eBeacon, and PCI of the serving cell (a base station) are all PCI 0.

3. The assistant site does not need to configure an interface such as an S1 interface or X2 interface.

4. A mobile terminal accesses a commercial network and camps on the base station. The base station configures the mobile terminal to measure a field strength of the assistant site, and the mobile terminal reports a measurement result to the base station.

Figure 9:
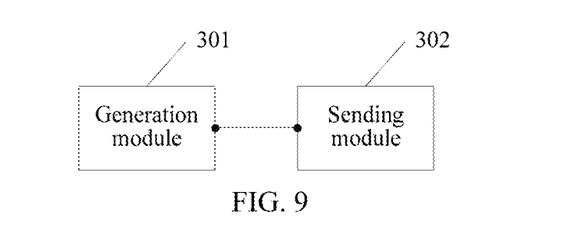
FIG. 9 is a schematic diagram of an embodiment of an assistant site according to embodiments of the present invention.

The positioning method according to the embodiments is described in the foregoing embodiments, and an assistant site according to the embodiments of the present invention is described in the following embodiments. Referring to FIG. 9, an embodiment of the assistant site according to the embodiments of the present invention includes:

a generation module 301, configured to generate a downlink assisted positioning signal; and a sending module 302, configured to send the downlink assisted positioning signal to a mobile terminal, so that a base station determines position information of the mobile terminal based on a measurement result obtained by the mobile terminal by measuring the downlink assisted positioning signal.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

In some embodiments, the downlink assisted positioning signal includes at least one of the following: a CRS and a PRS.

Figure 10:
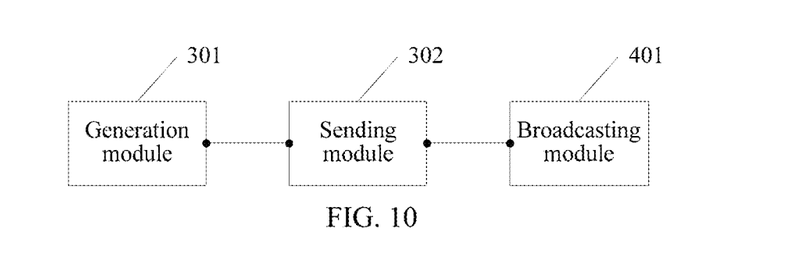
FIG. 10 is a schematic diagram of another embodiment of an assistant site according to embodiments of the present invention.

Further, as shown in FIG. 10, in some possible embodiments, the assistant site further includes:

a broadcasting module 401, configured to broadcast that the assistant site is a site that cannot be camped on and/or accessed.

Figure 11:
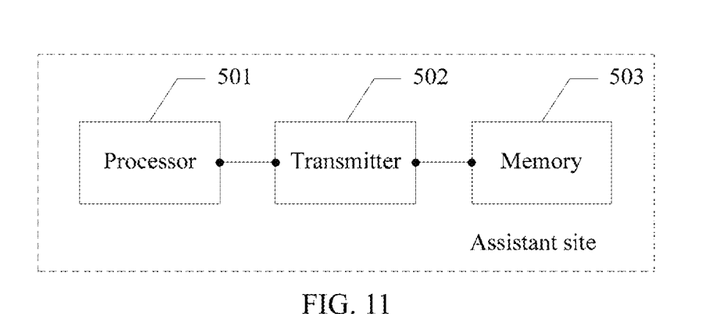
FIG. 11 is a schematic diagram of another embodiment of an assistant site according to embodiments of the present invention.

The assistant site in the embodiments is described above from a perspective of modular functional entities, and the assistant site in the embodiments is described below from a perspective of hardware processing. Referring to FIG. 11, the assistant site in the embodiments of the present invention includes a processor 501, a transmitter 502, and a memory 503.

The assistant site in the embodiments of the present invention may include more or fewer components than those shown in FIG. 11, or two or more components may be combined, or a different component deployment or setting may be used. The components may be implemented in hardware including one or more signal processing circuits and/or application-specific integrated circuits, software, or a combination of hardware and software.

The processor 501 is configured to perform the following operation:

generating a downlink assisted positioning signal.

The transmitter 502 is configured to perform the following operation:

sending the downlink assisted positioning signal to a mobile terminal, so that a base station determines position information of the mobile terminal based on a measurement result obtained by the mobile terminal by measuring the downlink assisted positioning signal.

The memory 503 is configured to store code required by the processor 501 for performing a corresponding operation.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

Figure 12:
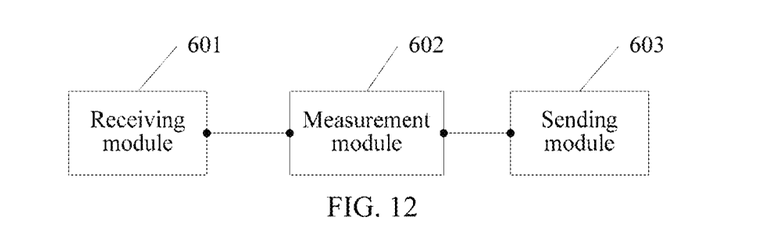
FIG. 12 is a schematic diagram of another embodiment of an assistant site according to embodiments of the present invention.

Referring to FIG. 12, another embodiment of the assistant site according to the embodiments includes:

a receiving module 601, configured to receive an uplink sounding signal sent by a mobile terminal;

a measurement module 602, configured to measure the uplink sounding signal to obtain a measurement result; and a sending module 603, configured to send the measurement result to a base station, so that the base station determines position information of the mobile terminal based on the measurement result.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

In some embodiments, the uplink sounding signal includes an SRS.

In some embodiments, the measurement module 602 is specifically configured to: receive indication information sent by the base station, and measure the uplink sounding signal based on the indication information, to obtain the measurement result, where the measurement result includes a TOA and an AOA of the uplink sounding signal.

Figure 13:
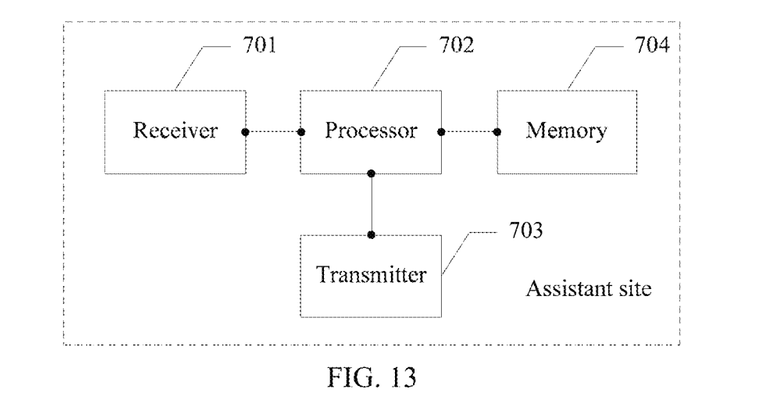
FIG. 13 is a schematic diagram of another embodiment of an assistant site according to embodiments of the present invention.

The assistant site in the embodiments of the present invention is described above from a perspective of modular functional entities, and the assistant site in the embodiments of the present invention is described below from a perspective of hardware processing. Referring to FIG. 13, the assistant site in the embodiments of the present invention includes a receiver 701, a processor 702, a transmitter 703, and a memory 704.

The assistant site in the embodiments of the present invention may include more or fewer components than those shown in FIG. 13, or two or more components may be combined, or a different component deployment or setting may be used. The components may be implemented in hardware including one or more signal processing circuits and/or application-specific integrated circuits, software, or a combination of hardware and software.

The receiver 701 is configured to perform the following operation:

receiving an uplink sounding signal sent by a mobile terminal.

The processor 702 is configured to perform the following operation:

measuring the uplink sounding signal to obtain a measurement result.

The transmitter 703 is configured to perform the following operation:

sending the measurement result to a base station, so that the base station determines position information of the mobile terminal based on the measurement result.

The memory 704 is configured to store code required by the processor 702 for performing a corresponding operation.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

The processor 702 is further configured to perform the following operations:

receiving indication information sent by the base station, and measuring the uplink sounding signal based on the indication information, to obtain the measurement result, where the measurement result includes a TOA and an AOA of the uplink sounding signal.

Figure 14:
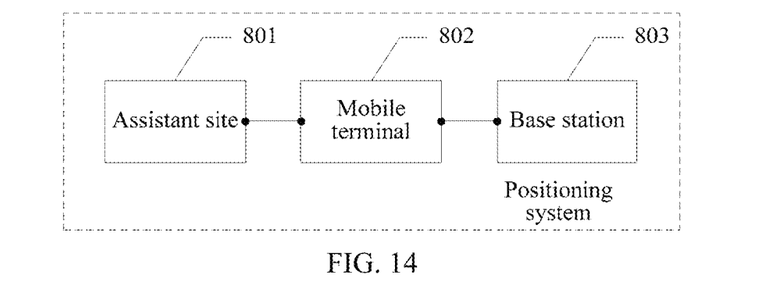
FIG. 14 is a schematic diagram of an embodiment of a positioning system according to embodiments of the present invention.

As shown in FIG. 14, an embodiment of the present invention further provides a positioning system. The positioning system includes:

an assistant site 801, a mobile terminal 802, and a base station 803.

The assistant site 801 is configured to: generate a downlink assisted positioning signal, and send the downlink assisted positioning signal to the mobile terminal 802.

The mobile terminal 802 is configured to receive the downlink assisted positioning signal; measure the downlink assisted positioning signal to obtain a measurement result; and send the measurement result to the base station 803.

The base station 803 is configured to: receive the measurement result, and determine position information of the mobile terminal 802 based on the measurement result.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

In some embodiments of the present invention, the base station 803 is further configured to send indication information to the mobile terminal 802. The indication information is used to instruct the mobile terminal 802 to measure the downlink assisted positioning signal.

Figure 15:
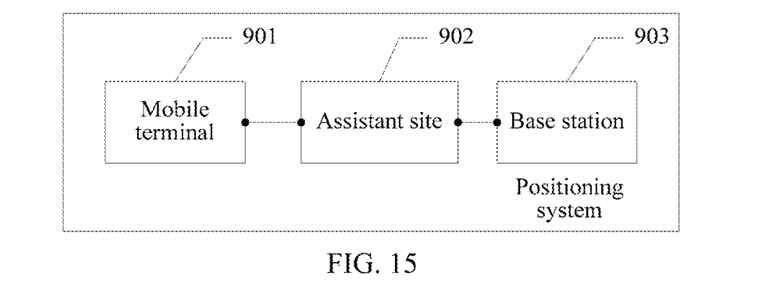
FIG. 15 is a schematic diagram of another embodiment of a positioning system according to embodiments of the present invention.

As shown in FIG. 15, an embodiment further provides a positioning system. The positioning system includes:

a mobile terminal 901, an assistant site 902, and a base station 903.

The mobile terminal 901 is configured to send an uplink sounding signal to the assistant site.

The assistant site 902 is configured to: receive the uplink sounding signal; measure the uplink sounding signal to obtain a measurement result; and send the measurement result to the base station 903.

The base station 903 is configured to: receive the measurement result, and determine position information of the mobile terminal based on the measurement result.

In this embodiment, because a better channel environment can be designed between the assistant site and the mobile terminal, the position information of the mobile terminal obtained by the base station has higher confidence, and the base station can more accurately position the mobile terminal. Therefore, according to the present invention, positioning accuracy of the mobile terminal can be improved.

In some embodiments, the base station 903 is further configured to send indication information to the assistant site 902. The indication information is used to instruct the assistant site 902 to measure the uplink sounding signal.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A positioning method, comprising:
   generating, by an assistant site, a downlink assisted positioning signal; and
   sending, by the assistant site, the downlink assisted positioning signal to a mobile terminal;
   broadcasting, by the assistant site, information indicating that the assistant site is a site that cannot be camped on and/or accessed;
   receiving, by the base station, a measurement of the downlink assisted positioning signal by the mobile terminal; and
   determining, by the base station, a position of the mobile terminal based on the received measurement of the downlink assisted positioning signal by the mobile terminal.

2. The method according to claim 1, wherein the downlink assisted positioning signal comprises at least one of the following: a cell-specific reference signal (CRS) or a position reference signal (PRS).

3. An assistant site, comprising:
   memory storing instructions; and
   one or more processors coupled to the memory to execute the instructions to:
   generate a downlink assisted positioning signal;
   send the downlink assisted positioning signal to a mobile terminal, wherein the downlink assisted positioning signal facilitates a base station to determine a position of the mobile terminal based on a measurement result obtained by the mobile terminal by measuring the downlink assisted positioning signal; and
   broadcast information indicating that the assistant site is a site that cannot be camped on and/or accessed.

4. The assistant site according to claim 3, wherein the downlink assisted positioning signal comprises at least one of the following: a cell-specific reference signal (CRS) or a position reference signal (PRS).

5. A positioning system, comprising an assistant site and a base station, wherein
   the assistant site is configured to:
   generate a downlink assisted positioning signal;
   send the downlink assisted positioning signal to a mobile terminal; and
   broadcast information indicating that the assistant site is a site that cannot be camped on and/or accessed; and
   the base station is configured to:
   receive the measurement of the downlink assisted positioning signal by the mobile terminal; and
   determine a position of the mobile terminal based on the received measurement of the downlink assisted positioning signal by the mobile terminal.

6. The positioning system according to claim 5, wherein the downlink assisted positioning signal comprises at least one of the following: a cell-specific reference signal (CRS) or a position reference signal (PRS).

7. The positioning system according to claim 5, wherein the base station is further configured to send indication information to the mobile terminal, wherein the indication information is configured to instruct the mobile terminal to measure the downlink assisted positioning signal.

* * * * *